United States Patent [19]

Ikushima et al.

[11] 4,199,222
[45] Apr. 22, 1980

[54] OPTICAL DEVICE WITH A LASER-TO-FIBER COUPLER

[75] Inventors: Ichiro Ikushima, Kokubunji; Mitsuo Tanaka, Ohme; Minoru Maeda, Tokyo, all of Japan

[73] Assignee: Hitachi, Ltd., Japan

[21] Appl. No.: 849,645

[22] Filed: Nov. 8, 1977

[30] Foreign Application Priority Data

Nov. 12, 1976 [JP] Japan .................. 51-135322

[51] Int. Cl.² ............................................. G02B 5/14
[52] U.S. Cl. ........................... 350/96.19; 350/96.18; 350/96.20
[58] Field of Search ............. 350/96.15, 96.18, 96.20, 350/96.19; 250/227

[56] References Cited

U.S. PATENT DOCUMENTS

| | | | |
|---|---|---|---|
| 2,506,672 | 5/1950 | Kell | 350/96.15 |
| 3,756,688 | 9/1973 | Hudson et al. | 350/96.15 |
| 3,779,628 | 12/1973 | Kapron et al. | 350/96.15 |
| 3,809,455 | 5/1974 | Pekau et al. | 350/96.19 |
| 3,894,789 | 7/1975 | Kobayashi et al. | 350/96.18 |
| 3,950,075 | 4/1976 | Cook et al. | 350/96.18 |
| 4,065,203 | 12/1977 | Goell et al. | 350/96.20 |
| 4,076,375 | 2/1978 | Muska et al. | 350/96.15 |

OTHER PUBLICATIONS

Dyott, "Direct Coupling from a GaAs Laser into a Single-Mode Fiber", *Electronics Letters*, Jul. 1975, vol. 11, No. 14.

*Primary Examiner*—Stewart J. Levy
*Attorney, Agent, or Firm*—Craig and Antonelli

[57] ABSTRACT

A laser-to-fiber coupler is constructed by an optical waveguide arranged between a semiconductor laser and a transmitting optical fiber through which an optical beam emanating from the laser is transmitted in order to reduce the amount of a reflection beam from the optical fiber, which is injected into the active layer of the semiconductor laser.

The waveguide is made by an optical fiber of which at least one of core radius or numerical aperture (N.A.) is smaller than those of the transmitting optical fiber.

14 Claims, 10 Drawing Figures

OPTICAL DEVICE WITH A LASER-TO-FIBER COUPLER

BACKGROUND OF THE INVENTION

1. Field of the Invention

This invention relates to an optical device and, in particular to a laser-to-fiber coupler which guides an optical beam from a semi-conductor laser to an optical fiber used for transmitting the optical beam.

2. Description of the Prior Art

Rapid progress in the development of optical fiber and the semiconductor laser is accelerating a practical use of an optical communication systems.

However, there remain still many problem to be solved.

One of these problems a connection concerns between a semi-conductor laser and an optical fiber used as transmission line. A reflected optical beam generated in an optical fiber due to a fiber-to-fiber or to other device connections, a crack, bending of a fiber, and so on, may be introduced from the input surface of the optical fiber into the active region of the semiconductor laser such as a GaAs laser, and make the operation of the laser unstable. That is, when the reflected optical beam is introduced into the active region of the semiconductor, laser, the drive current to optical output characteristic, spectrum and modulated optical output wave of the laser are effected by the reflected optical beam. The effect is proportional to the quantity of the reflected beam.

This problem is a serious one for an optical communication system. Although many types of optical connectors have been proposed, there is no optical connector that has solved the above problem

SUMMARY OF THE INVENTION

Therefore, an object of the present invention is to provide a laser-to-fiber coupler or an optical device which couples the output optical beam emanating from semiconductor laser with the optical fiber effectively, and at the same time, reduces the amount of the reflected beam impinging into the active region of the semiconductor laser.

To attain the above object, the optical device in accordance with this invention is constructed by a waveguide arranged between the input surface of a transmitting optical fiber and a semiconductor laser. The waveguide has the same construction as the optical fiber, a so-called step type optical fiber. That is, the waveguide is made by a core having a uniform reflective index, and a cladding layer having a refractive index smaller than that of the core.

Further, at least one of the core radius and numerical aperture of the waveguide is smaller than that of the transmitting optical fiber to be connected.

In the above construction, most of the reflected optical beam from the optical fiber is not coupled with the waveguide.

Accordingly, the quantity of the reflected beam injected into the active region of the semiconductor laser is extremely reduced and the operation of the laser becomes stable.

The above-mentioned and other features and objects of this invention will become more apparent by reference to the following description taken in conjunction with the accompanying drawings.

DESCRIPTION OF THE PREFERED EMBODIMENT

Figure 1:
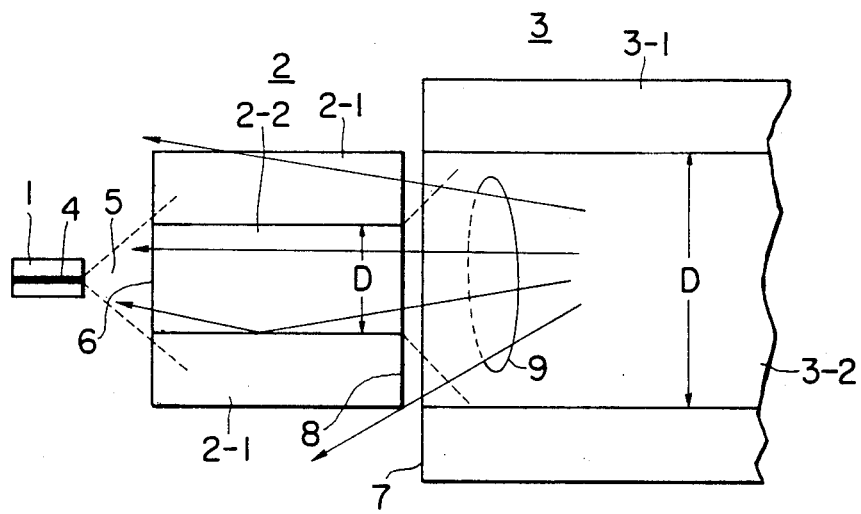
FIG. 1 is a schematic cross sectional view of one embodiment of an optical device in accordance with this invention.

FIG. 1 shows a schematic cross-sectional view of an optical device in accordance with this invention for explaining the principle of this invention. In FIG. 1, optical beam 5 is emanated from the active region 4 of a semiconductor laser 1 and most of the beam is coupled with a waveguide 2 and an optical fiber 3, where the waveguide 2 and the optical fiber have the same type of construction consisting of a core having uniform refractive index $n_1$ and a cladding layer having refractive index $n_2$ lower than that of the core, namely, a step type optical fiber.

The length of the waveguide is over 2~ tens centimeter depending on the optical device, namely the laser-to-fiber coupler. The distance between the output surface of the laser 1 and the input surface of the waveguide 2 is about several micrometers.

Further, an essential feature of this invention is that at least one of the core radius $D_2$ and numerical aperture $(N.A.)_2$ of the wave guide 2 is smaller than that $D_3$, $(N.A.)_3$ of an optical fiber 3 to be connected. Generally, some of the optical beam in an optical fiber is reflected at points between two optical fibers or an optical fiber and another optical device and by a bending and the existence of cracks and inpurities.

Therefore, some of the reflected beam is transmitted reversely and impinges into the active region of the laser 1.

However, in the optical device in accordance with this invention described above, the quantity of the reflected beam impinging on the active region is remarkably decreased without a reduction of optical coupling from the semiconductor laser to the optical fiber.

Assuming that core radii and numerical apertures of the waveguide 2 and an optical fiber 3 are $D_2$, $D_3$, $NA_2$, $NA_3$ respectively and the reflected beam in the optical fiber is distributed uniformly over the input surface of core 3-2, the ratio R between quantity of the reflected beam emanating from the input surface of the optical fiber 3 and the quantity of the reflected beam been coupled with the waveguide 2 is represented by the following formula.

$$R = \frac{D_2^2}{D_3^2} \cdot \frac{1 - \sqrt{1 - (NA_2)^2}}{1 - \sqrt{1 - (NA_3)^2}}$$

The numerical aperture N.A., which is a measure of the light gathering ability of the optical fiber, is defined as follows:

$$N.A. = (n_1^2 - n_2^2)^{\frac{1}{2}}$$

As described above, $D_2 < D_3$ and or $NA_2 < NA_3$, the value of the ratio R is smaller than one.

For example, for assuming $D_2 = \frac{1}{2}D_3$ and/$NA_2 = NA_3$, R is equale to 0.25. By adding the condition $NA_2 < NA_3$ to the above condition $D_2 = \frac{1}{2}D_3$, the value R is decreased further.

Figure 2:
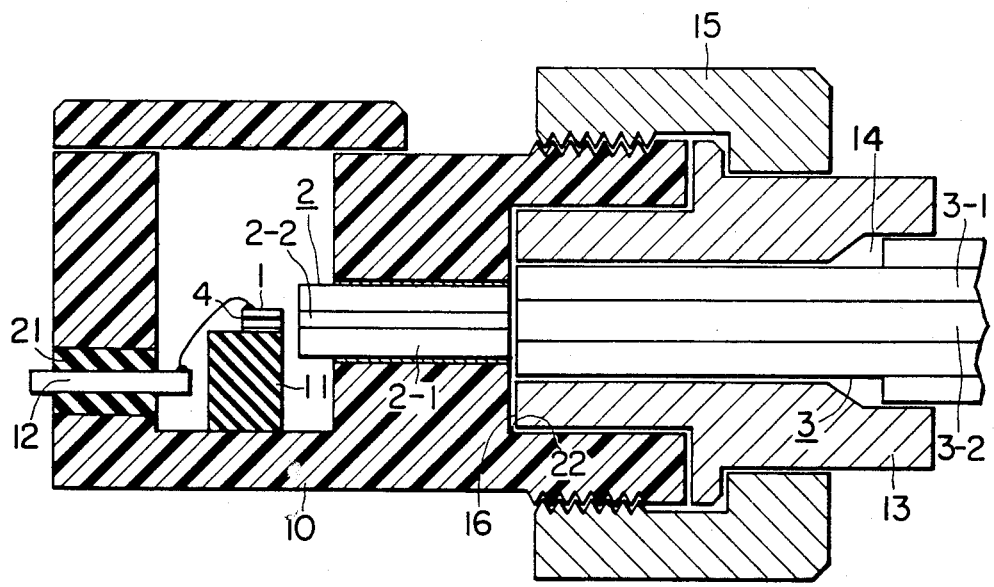
FIG. 2 is a cross sectional view of one embodiment of an optical device constructed in accordance with this invention.

In FIG. 2, which shows a cross-sectional view of an embodiment of an optical device in accordance with this invention, a (measstripe-geometry) GaAs semiconductor laser 1 with an active layer 4 (thickness of about 0.1μ meter) is mounted on a copper mount 11 which is attached on one inner surface of housing 10 by indium solder. The laser 1 is energized by a electrical leads 12 which extend through housing 10. Layer 21 is an insulating material. Waveguide 2 is attached through aperture of the housing 10. The surface of the waveguide 2 is fixed to the inner surface of the aperture with bonding material such as Ni, Au and In. The waveguide 2 is axially aligned with an optical fiber 3 to be connected and the active layer 4 of laser 1. The distance between the output surface of laser 1 and the input surface of the waveguide is about 5 μm. The end of an optical fiber to be connected with the laser 1 is disposed in termination ferrule 13 which is provided with an aperture 14 that is tapered to facilitate the insertion of fiber 3 therein. The end of the fiber 3 and ferrule is flat and substantially perpendicular to the longitudinal axis of fiber 3.

Ferrule 13 is inserted into an aperture 22 provided in the housing 10. Sleeve 15 is threaded onto housing 10 and tighted, thereby causing end face 16 to bear upon the bottom of the aperture 22. The ferrule 13, sleeve 15 and aperture 14 form a fiber mechanically connecting means.

In the above embodiment, the core radius $D_2$ of the waveguide 2 is 50 μm and the core radius $D_3$ of the optical fiber 3 is 80 μm, and the numerical aperture $NA_2$ of the waveguide 2 is equal to that of the optical fiber 3.

It is needless to say that this invention is not limitted to above embodiment.

To improve the coupling efficiency and the reduction of coupling of the reflecting beam, the following arrangements may be used.

Figure 3:
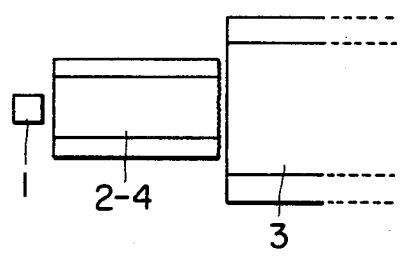
FIGS. 3, 4, 5, 6, 7, 8, 9 and 10 are schematic cross sectional views of other embodiments of optical device in accordance with this invention.
Figure 4:
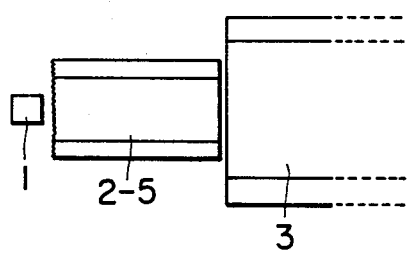
Figure 5:
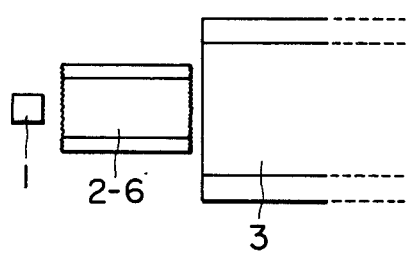

In FIGS. 3, 4 and 5, the surface of at least one end of the waveguides 2-4, 2-5 and 2-6 is coarse or roughened. These embodiments are useful for effectively diffusing light and eliminating undesirable variations in the intensity of the reflected beam due to the inequality of light distribution in the optical fiber 3.

Figure 6:
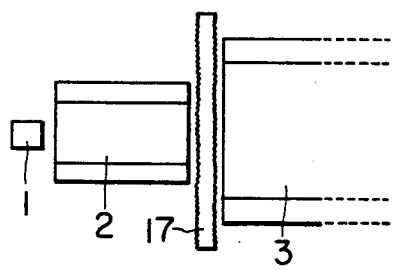

In the embodiment shown in FIG. 6, a thin transparent film 17 is interposed between the waveguide 2 and the optical fiber 3. Both surfaces of the film 17 are rough in order to obtain the same effect as those of roughened surfaces of the waveguides.

Figure 7:
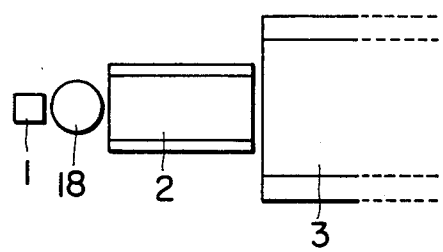
Figure 8:
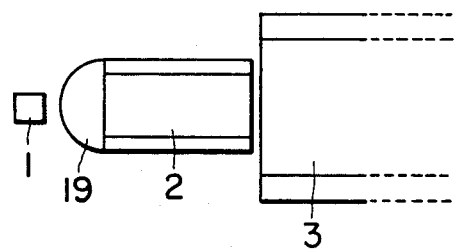

In the embodiments shown in FIGS. 7 and 8, in order to improve the optical coupling efficiency, optical lenses 18 and 19 are located between the semiconductor laser 1 and the waveguide 2.

Figure 9:
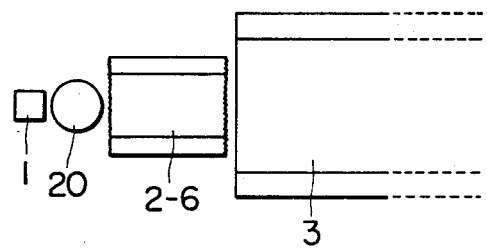

In the embodiment shown in FIG. 9, an optical coupling part is constructed by the combination of optical lens 20 and a waveguide 2-C of which both surfaces are roughened.

Figure 10:
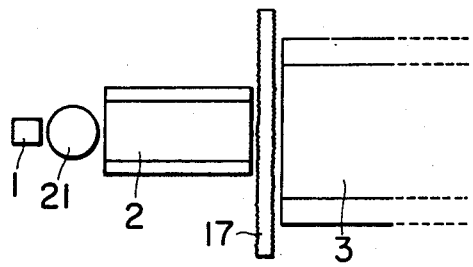

In the embodiment shown in FIG. 10, an optical coupling part is constructed by the combination of an optical lens 20, a waveguide 2 and thin film 17 having rough surfaces aligned in order.

These embodiments of optical devices have advantages that the optical coupling efficiency is improved and, at the same time, it is possible to stabilize the operation of the semiconductor laser freely from the reflected beam.

We claim:

1. An optical device for coupling an optical beam emanating from a semiconductor laser with an optical fiber in longitudinal alignment therewith, comprising:
    (a) a semiconductor laser mounted in a housing;
    (b) a fiber mechanically connecting means constructed by use of the part of the housing; and
    (c) a waveguide, arranged between the laser and the fiber connecting means and fixed on the housing, which is constructed of a core having a uniform refractive index and a cladding layer having a refractive index smaller than that of the core, wherein at least one of the core radius and numerical aperture of the waveguide is smaller than that of an optical fiber to be coupled with the laser optically by use of the fiber connecting means, and wherein the surface of at least one of two end faces of the waveguide is roughened.

2. An optical device according to claim 1, which further includes an optical lens arranged between the laser and the waveguide.

3. An optical device for coupling optical beam emanating from a semiconductor laser with an optical fiber in longitudinal alignment therewith, comprising:
    (a) a semiconductor laser mounted in a housing;
    (b) a fiber mechanically connecting means constructed by use of the part of the housing;
    (c) a waveguide arranged between the laser and fiber connecting means and fixed on the housing, which is constructed of a core having a uniform refractive index and a cladding layer having a refractive index smaller than that of the core, wherein at least one of the core radius and numerical aperture of the waveguide is smaller than of an optical fiber to be coupled with the laser optically by use of the fiber connecting means; and
    (d) a transparent member arranged between the waveguide and the optical fiber in a direction perpendicular to the axis of the optical fiber, at least one surface of the transparent member being roughened.

4. An optical device according to claim 3, which further comprises an optical lens arranged between the laser and the waveguide.

5. An optical device according to claim 3, wherein the transparent member is a thin film.

6. An arrangement for coupling an optical beam emitted from a laser device with an optical fiber in alignment therewith, comprising an optical waveguide and at least one light diffusing surface disposed optically in series with said laser device and an end of said optical fiber.

7. An arrangement according to claim 6, wherein said at least one light diffusing surface is formed by a roughened surface of one end of said waveguide.

8. An arrangement according to claim 6, wherein said at least one light diffusing surface is formed by the roughened surfaces of opposite ends of said waveguide.

9. An arrangement according to claim 6, wherein said at least one light diffusing surface is formed of a thin light transmitting element, at least one surface of which is roughened.

10. An arrangement according to claim 9, wherein opposite surfaces of said light transmitting element are roughened.

11. An arrangement according to claim 10, wherein said light transmitting element is disposed between said waveguide and said optical fiber.

12. An arrangement according to claim 6, further comprising a lens disposed optically in series with said laser device, said waveguide, said at least one roughened surface, and said fiber.

13. An arrangement according to claim 6, wherein said at least one light diffusing surface comprises a plurality of spaced apart light diffusing surfaces.

14. An arrangement according to claim 6, wherein said waveguide comprises a core having a uniform index of refraction and a cladding layer having an index of refraction smaller than that of said core, and wherein at least one of the core radius and numerical aperture of said waveguide is smaller than that of said optical fiber.

* * * * *